(12) United States Patent
Ashank et al.

(10) Patent No.: US 9,934,024 B2
(45) Date of Patent: Apr. 3, 2018

(54) DYNAMICALLY PATCHING KERNELS USING STORAGE DATA STRUCTURES

(71) Applicants: HEWLETT-PACKARD DEVELOPMENT COMPANY, L.P., Houston, TX (US); Bhandari Ashank, Bangalore, Karnataka (IN); Abhay Padlia, Bangalore, Karnataka (IN)

(72) Inventors: Bhandari Ashank, Bangalore (IN); Abhay Padlia, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 42 days.

(21) Appl. No.: 15/113,508

(22) PCT Filed: Jan. 24, 2014

(86) PCT No.: PCT/IN2014/000050
§ 371 (c)(1),
(2) Date: Jul. 22, 2016

(87) PCT Pub. No.: WO2015/111067
PCT Pub. Date: Jul. 30, 2015

(65) Prior Publication Data
US 2017/0010879 A1    Jan. 12, 2017

(51) Int. Cl.
*G06F 9/44* (2006.01)
*G06F 9/45* (2006.01)
(Continued)

(52) U.S. Cl.
CPC ............ *G06F 8/65* (2013.01); *G06F 8/67* (2013.01); *G06F 9/542* (2013.01); *G06F 9/485* (2013.01); *G06F 2009/45575* (2013.01)

(58) Field of Classification Search
CPC ...... G06F 8/65; G06F 8/67; G06F 9/542; G06F 9/485; G06F 2009/45575
See application file for complete search history.

(56) References Cited

U.S. PATENT DOCUMENTS 7,076,647 B2   7/2006   Roth et al.
7,162,710 B1   1/2007   Edwards et al.
(Continued)

FOREIGN PATENT DOCUMENTS

CN   101482834   7/2009
CN   102508713   6/2012
(Continued)

OTHER PUBLICATIONS

Dannie M. Stanley, Guest-Transparent Instruction Authentication for Self-Patching Kernels, pp. 1-6, 2013 (Year: 2013).*
(Continued)

*Primary Examiner* — Thuy Dao
*Assistant Examiner* — Mongbao Nguyen
(74) *Attorney, Agent, or Firm* — Hewlett Packard Enterprise Patent Department (57) ABSTRACT

A system and method for patching a kernel. The method includes receiving an online patch request, parsing a global kernel thread list to determine kernel threads associated with a target function, maintaining a storage data structure including identifiers of the determined kernel threads, and parsing the determined kernel threads using the identifiers in the storage data structure to determine when the global kernel thread list is free of the target function upon encountering an event associated with the target function.

15 Claims, 4 Drawing Sheets

(51) Int. Cl.
*G06F 9/445* (2006.01)
*G06F 9/54* (2006.01)
*G06F 9/455* (2018.01)
*G06F 9/48* (2006.01)

(56) References Cited

U.S. PATENT DOCUMENTS

| | | | | |
|---|---|---|---|---|
| 7,389,497 | B1* | 6/2008 | Edmark | G06F 11/3612 |
| | | | | 714/E11.207 |
| 8,341,649 | B2* | 12/2012 | Freericks | G06F 9/542 |
| | | | | 719/318 |
| 8,499,289 | B2 | 7/2013 | Dai et al. | |
| 2005/0204205 | A1* | 9/2005 | Ring | G06F 21/57 |
| | | | | 714/47.1 |
| 2006/0288341 | A1* | 12/2006 | Wurden | G06F 8/67 |
| | | | | 717/168 |
| 2009/0187725 | A1* | 7/2009 | Mencias | G06F 8/67 |
| | | | | 711/171 |
| 2010/0205587 | A1 | 8/2010 | Dai et al. | |
| 2011/0126179 | A1* | 5/2011 | Hartman | G06F 8/67 |
| | | | | 717/140 |
| 2011/0271270 | A1* | 11/2011 | Bowen | G06F 8/67 |
| | | | | 717/171 |
| 2012/0066274 | A1* | 3/2012 | Stephenson | G06F 8/65 |
| | | | | 707/825 |
| 2013/0227563 | A1* | 8/2013 | McGrath | G06F 8/60 |
| | | | | 718/1 |
| 2014/0019950 | A1* | 1/2014 | Ohmura | G06F 8/65 |
| | | | | 717/168 |
| 2014/0130031 | A1* | 5/2014 | Exton | G06F 8/65 |
| | | | | 717/171 |
| 2014/0215151 | A1* | 7/2014 | Yasuhara | G06F 3/0619 |
| | | | | 711/114 |
| 2014/0344832 | A1* | 11/2014 | Kannan | G06F 21/52 |
| | | | | 719/313 |

FOREIGN PATENT DOCUMENTS

| | | | |
|---|---|---|---|
| WO | WO-0001170 | 1/2000 | |
| WO | WO-2011000279 A1 * | 1/2011 | G06F 8/65 |

OTHER PUBLICATIONS

Peter Feiner, Comprehensive Kernel Instrumentation via Dynamic Binary Translation, pp. 1-12, 2012 (Year: 2012).*
Owen S. Hofmann, Ensuring Operating System Kernel Integrity with OSck, pp. 1-12, 2011 (Year: 2011).*
Baumann, A. et al. ; Providing Dynamic Update in an Operating System; https://www.usenix.org/legacy/events/usenix05/tech/general/full_papers/baumann/baumann>: Mar. 14, 2005.
Giuffrida, C. et al.; Safe and Automated State Transfer for Secure and Reliable Live Update;http://www.cs.vu.nl/~giuffrida/papers/hotswup-2012.pdf >; Apr. 24, 2012; 5 pages.
International Searching Authority, The International Search Report and the Written Opinion, dated Oct. 29, 2014, 13 Pages.
Neamtiu, I. et al.; Safe and Timely Dynamic Updates for Multi-threaded Programs; http://www.cs.umd.edu/~mwh/papers/ginsengMT.pdf >; Jun. 15-20, 2009.

* cited by examiner

DYNAMICALLY PATCHING KERNELS USING STORAGE DATA STRUCTURES

BACKGROUND

Business applications commonly utilize systems and software to provide a service. Patches or updates may be available for the systems and software from time to time to incorporate new features, improve reliability and functionality of the service. These patches or updates can fix or otherwise eliminate bugs (e.g., an error, flaw, fault, or other unintended result) in the system and/or software.

DETAILED DESCRIPTION

In the following description and figures, some example implementations of systems and/or methods for patching kernels are described. A kernel is a computer program that acts as an intermediary between application software and the hardware of the computer. For example, a kernel can manage input/output ("IO") requests from software for data processing on a central processing unit ("CPU"). A kernel, just as other software, can be updated by applying a patch to the computer program instructions. As used herein, a patch can be a second set of instructions designed to replace a first set of instructions.

A patch can replace an entire instruction block. Alternatively, a patch can replace the first few lines of an instruction block with a jump instruction to a separate instruction block. For example, the first few lines/first 'N' instructions of a to-be-patched function can be replaced with a long jump to a memory address where the replacement instruction block is located. Patch updates commonly request a reboot of the system to apply a patch. However, mission critical applications commonly expect the system to provide uninterrupted service. As a result, administrators can avoid updating a system to avoid downtime of mission critical application. Thus, the outdated system may continue to be affected by the bugs until a time to reboot is determined and those effects could be avoided if the system was updated in a timely fashion.

A patch can be applied to a kernel without a reboot using a kernel dynamic patching technique. Before applying a patch, a safe point needs to be detected. For example, a safe point to apply a patch would be when the to-be-patched instructions are not in use. The memory allocated to the kernel can be checked to verify whether a set of instructions is in use by the kernel. For example, interrupts can be sent to halt operations on the system, and a global kernel thread list in the memory can be traversed to determine if an instruction pointer to the to-be-patched instructions exists. Commonly, the system can be halted and processors can be used to traverse the global kernel thread list. Further, if an instruction pointer to the to-be-patched instructions exists (i.e., the to-be-patched instructions are in use), the processors return to executing the prior operations, and wait a time before trying to parse the global kernel thread list again. It may be tedious and relatively time consuming to traverse through the global kernel thread list every time.

Various examples described below relate to maintaining a reduced set of global kernel thread list in the form of another storage data structure, such as linked list data structure and array data structure, to efficiently determine when the kernel threads are free of the target function. The global kernel thread list is a data structure including the kernel threads of all the processes in the system. For example, the global kernel thread list is initially parsed to determine kernel threads associated with a target function (i.e., to be patched function), a linked list data structure of thread identifiers of the determined kernel threads is maintained, and stacks associated with these determined kernel threads in the linked list data structure are parsed when an event is encountered. For example, the event can include receiving a new call to the target function, expiration of a maximum waiting time for applying kernel patch, or expiration of a time interval when no new call is made to the target function. Thus, the system can be brought to a safe state for dynamic kernel patching and the processing time to bring the system to the safe point can also be reduced.

Figure 1:
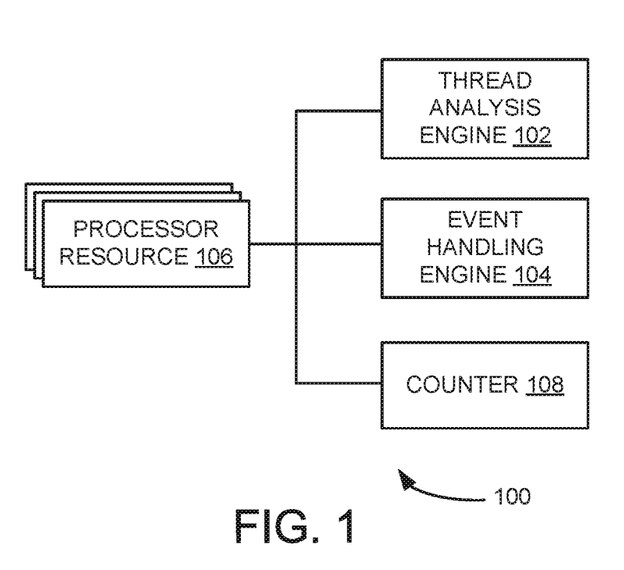
FIGS. 1 and 2 are block diagrams depicting example systems for patching a kernel.
Figure 2:
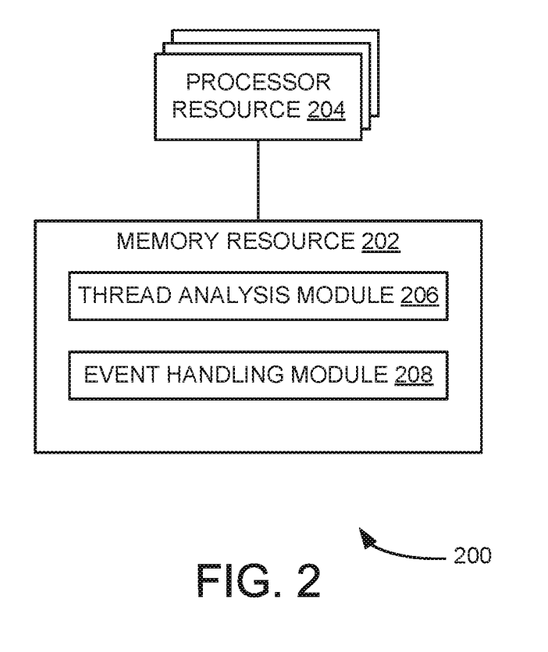

FIGS. 1 and 2 are block diagrams depicting example systems for patching a kernel. Referring to FIG. 1, an example kernel patching system 100 generally includes a plurality of processor resources 106, a thread analysis engine 102, an event handling engine 104, and a counter 108. Each of the plurality of processor resources 106 represent a computational unit to carry out instructions, such as perform arithmetical operations, logical operations, and IO operations. Common references to a processor resource include "CPU," "processor," and "core." The plurality of processor resources 106 can be integrated on a single chip or distributed across multiple chips.

The thread analysis engine 102 represents any combination of circuitry and executable instructions to analyze a global kernel thread list using the processor resources 106 to determine kernel threads associated with a target function. A global kernel thread list is a data structure containing references to the instructions in memory used by a kernel thread. For example, the global kernel thread list can be a list of all kernel threads that are currently executing in the system. The target function can be a set of instructions, or an instruction block, to be updated by the patch.

In one example, the global kernel thread list can be processed by a single processor resource to determine kernel threads associated with a target function. Alternately, the global kernel thread list can be divided into a number of portions and the portions can be distributed among the plurality of processor resources based on number of processor resources and/or the size of the global kernel thread list.

The thread analysis engine 102 can determine kernel threads associated with a target function by comparing kernel threads of the global kernel thread list to a target function. For example, a kernel thread can contain an attribute that represents a reference to a memory address associated with the global kernel thread list and that attribute can be compared to a pointer to the target function to determine whether the pointer references the same memory address as contained in the kernel thread. For example, the thread analysis engine 102 can determine when an instruction pointer of the target function is in the kernel threads. Thus, the thread analysis engine 102 can process the kernel threads in the global kernel thread list to determine when the global kernel thread list is in a potentially safe state for kernel patching, such as when the global kernel thread list is free of the target function.

In one example, the thread analysis engine 102 can set a start flag to trigger processing the global kernel thread list on processor resources 106 to find stacks of kernel threads associated with a target function. In this case, the stack may refer to a per kernel thread stack which needs to be parsed to find the to-be-patched function's footprint. Further, the thread analysis engine 102 maintains a storage data structure (e.g., linked list data structure and array data structure) including identifiers of the determined kernel threads. Each determined kernel thread in the storage data structure may include a link to the next determined kernel thread. Also, the thread analysis engine 102 can maintain the counter 108 including a thread count of kernel threads containing the target function. The counter 108 represents any combination of circuitry and executable instructions to store and sometimes display the thread count of kernel threads containing the target function. The thread count of zero indicates that the global kernel thread list is free of the target function.

The thread analysis engine 102 can set a stop flag once a reference to the target function is found. For example, the thread analysis engine 102 can set the stop flag to signal the plurality of processor resources 106 that a reference to the target function is found and return to executing the prior operations, and wait for an event before trying to parse the kernel threads again. For example, the event can include receiving a new call to the target function, expiration of a maximum waiting time for applying kernel patch, or expiration of a time interval when no new call is made to the target function.

The event handling engine 104 represents any combination of circuitry and executable instructions to parse the kernel threads using the identifiers in the storage data structure upon encountering the event associated with the target function. For example, the event handling engine 104 parses the stacks of each of the kernel threads in the storage data structure to determine when the global kernel thread list is free of the target function. Further, the thread count in the counter 108 and the storage data structure are updated each time when the kernel threads in the storage data structure are parsed after encountering the event.

In one example, when a new call is made to the target function and if the thread count in the storage data structure is not zero, then the event handling engine 104 calls a sleep function to suspend execution of a current thread associated with the new call for a specific time. Further, the event handling engine 104 halts the kernel operations, parses the determined kernel threads using the identifiers in the storage data structure to determine whether the global kernel thread list is free of the target function, and updates the counter 108 while the current thread associated with the new call is in sleep.

In another example, if the time interval before any new call is made to the target function expires, the event handling engine 104 halts the kernel operations, parses the determined kernel threads using the identifiers in the storage data structure to determine whether the global kernel thread list is free of the target function, and updates the counter. In yet another example, if the maximum waiting time for applying kernel patch expires, the event handling engine 104 halts kernel operations, parses the determined kernel threads using the identifiers in the storage data structure to determine whether the global kernel thread list is free of the target function, and updates the counter. When the global kernel thread list is free of the target function, then the event handling engine 104 notifies results to thread analysis engine 102 for applying kernel patching.

FIG. 2 depicts a system 200 for patching a kernel that can be implemented on a memory resource 202 operatively coupled to a processor resource 204. The processor resource 204 can be a single or a plurality of processor resources. Referring to FIG. 2, the memory resource 202 can contain a set of instructions that can be executable by the processor resource 204. The set of instructions can implement the system 200 when executed by the processor resource 204. The set of instructions stored on the memory resource 202 can be represented as a thread analysis module 206 and an event handling module 208. The processor resource 204 can carry out the set of instructions to execute the thread analysis module 206, the event handling module 208, and/or any appropriate operations among or associated with the modules of the system 200. For example, the processor resource 204 can carry out a set of instructions to receive an online patch request, send an interrupt to halt kernel operations, parse a global kernel thread list to determine kernel threads associated with a target function, maintain a storage data structure including identifiers of the determined kernel threads, resume the halted kernel operations, halt the kernel operations upon encountering an event associated with the target function, and parse the determined kernel threads using the identifiers in the storage data structure to determine when the global kernel thread list is free of the target function. The processor resource 204 can carry out a set of instructions to set a start flag to signal the processor resources to halt the kernel operations and begin parsing the global kernel thread list, and set a stop flag to signal the processor resources to resume execution of previous kernel operations, and wait for the event.

The thread analysis module 206 and the event handling module 208 represent program instructions that when executed function as the thread analysis engine 102 and the event handling engine 104 of FIG. 1, respectively. The processor resource 204 can be one or multiple CPUs capable of retrieving instructions from the memory resource 202 and executing those instructions. The processor resource 204 can process the instructions serially, concurrently, or in partial concurrence, unless described otherwise herein.

The memory resource 202 represents a medium to store data utilized by the system 200. The medium can be any non-transitory medium or combination of non-transitory mediums able to electronically store data and/or capable of storing the modules of the system 200 and/or data used by the system 200. For example, the medium can be a storage medium, which is distinct from a transmission medium, such as a signal. The medium can be machine readable, such as computer readable.

In the discussion herein, the engines 102 and 104 of FIG. 1 and the modules 206 and 208 of FIG. 2 have been described as a combination of circuitry and executable instructions. Such components can be implemented in a number of fashions. Looking at FIG. 2, the executable instructions can be processor executable instructions, such as program instructions, stored on the memory resource 202, which is a tangible, non-transitory computer readable storage medium, and the circuitry can be electronic circuitry, such as processor resource 204, for executing those instructions. The memory resource 202 can be integrated in the same device as the processor resource 204 or it can be separate but accessible to that device and the processor resource 204. The memory resource 202 can be distributed across devices.

In one example, the executable instructions can be part of an installation package that when installed can be executed by processor resource 204 to implement the system 200. In that example, the memory resource 202 can be a portable medium such as a CD, a DVD, a flash drive, or memory maintained by a computer device, such as server device 316 of FIG. 3, from which the installation package can be downloaded and installed. In another example, the executable instructions can be part of an application or applications already installed. Here, the memory resource 202 can include integrated memory such as a hard drive, solid state drive, or the like.

Figure 3:
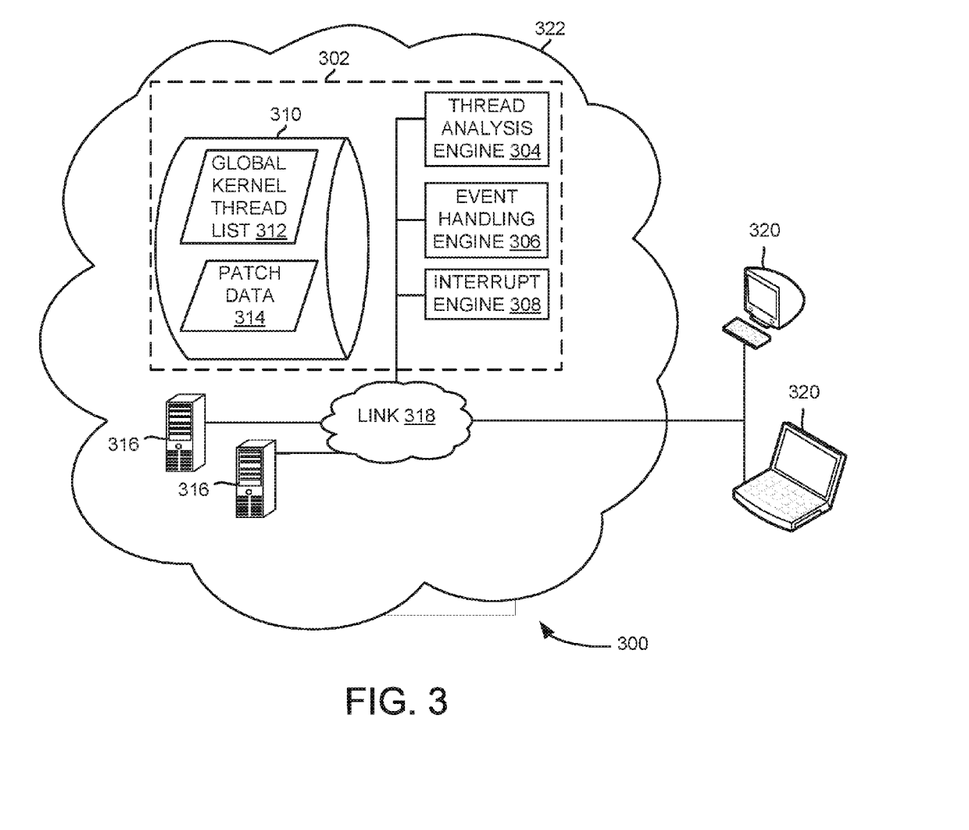
FIG. 3 depicts example environments in which various example systems for patching a kernel can be implemented.

FIG. 3 depicts example environments in which various example systems 302 for patching a kernel can be implemented. The example environment 300 is shown to include an example system 302 for patching a kernel. The system 302 (described herein with respect to FIGS. 1 and 2) can represent generally any combination of circuitry and executable instructions to patch a kernel. The system 302 can include a thread analysis engine 304 and an event handling engine 306 that can be the same as the thread analysis engine 102 and the event handling engine 104 of FIG. 1, respectively, and, for brevity, the associated descriptions are not repeated.

The example system 302 of FIG. 3 also includes an interrupt engine 308. The interrupt engine 308 represents any combination of circuitry and executable instructions to send an interrupt to the processor resources when a set of patch data is received. The interrupt engine 308 can send the interrupt to halt kernel operations on the processor resources. In particular, an interrupt can be sent to the processor resources to stop the kernel operations of instructions and, thereby, provide a time for processing the global kernel thread list and/or determined kernel thread lists in the storage data structure. The thread analysis engine 304 and event handling engine 306 can halt operations of the processor resources via the interrupt engine 308. The thread analysis engine 304 can send an interrupt to cause the operations of the processor resources to pause. The interrupt sent by the interrupt engine 308 can be an interrupt of a degree to ensure the plurality of processor resources halt operations and the global kernel thread list does not change during the safe state detection processing. The degree and type of interrupt can be selected based on the type of operations being performed. For example, the interrupt having a first level of priority can be sent when the processor resources are executing functions having a second level of priority, where the first level of priority is higher than the second level of priority.

The data associated with the system 302 can be stored in a data store 310. For example, the data store 310 can store the global kernel thread list 312 and a set of patch data 314, which can include a reference associated with a target function to compare to the global kernel thread list 312. The global kernel thread list 312 can represent a segment of a memory resource associated with the kernel. For example, the kernel can have multiple threads executing on processor resources where each thread is executing an operation performed by the kernel. The data store 310 can be accessible by the engines 304, 306, and 308 to maintain data associated with the system 302.

The example system 302 can be integrated into a server device 316 or a client device 320. For example, the client device 320 can include the system 302, a multi-core processor, and a kernel to be patched using the system 300. The system 300 can be distributed across server devices 316, client devices 320 or a combination of server devices 316 and client devices 320. For example, an administrator, via a client device 320, can trigger the dynamic patching operation on server devices 316 that upon receiving this external trigger from the client device 320 can internally trigger the thread analysis engine 304 and the event handling engine 306 on the server device 316 to perform the operations for patching the kernel described herein. The environment 300 can include a cloud computing environment, such as cloud network 322. For example, any appropriate combination of the system 302, server devices 316, and client devices 320 can be a virtual instance and/or can reside and/or execute on a virtual shared pool of resources described as a "cloud." In such an example, the kernels of the virtual machines of the cloud can be patched using the system 302. The cloud network 322 can include any number of clouds.

In the example of FIG. 3, a client device 320 can access a server device 316. The server device 316 can represent generally any computing devices to respond to a network request received from the client device 320. For example, a server device 316 can be a virtual machine of the cloud network 322 providing a service and the client device 320 can be a computing device to access the cloud network 322 and receive and/or communicate with the service. A server device 316 can include a webserver, an application server, or a data server, for example. The client devices 320 represent generally any computing devices with a browser or other application to communicate such requests and receive and/or process the corresponding responses. A link 318 represents generally one or any combination of a cable, wireless, fiber optic, or remote connections via a telecommunications link, an infrared link, a radio frequency link or any other connectors of systems that provide electronic communication. The link 318 can include, at least in part, intranet, the Internet, or a combination of both. The link 318 can also include intermediate proxies, routers, switches, load balancers, and the like.

Referring to FIGS. 1-3, the engines 102 and 104 of FIG. 1 and/or the modules 206 and 208 of FIG. 2 (represented as engines 304 and 306 of FIG. 3), as well as engine 308, can be distributed across server devices 316, client devices 320, other devices or storage mediums, or a combination thereof. The engines and/or modules can perform the example methods described in connection with FIGS. 4-6.

Figure 4:
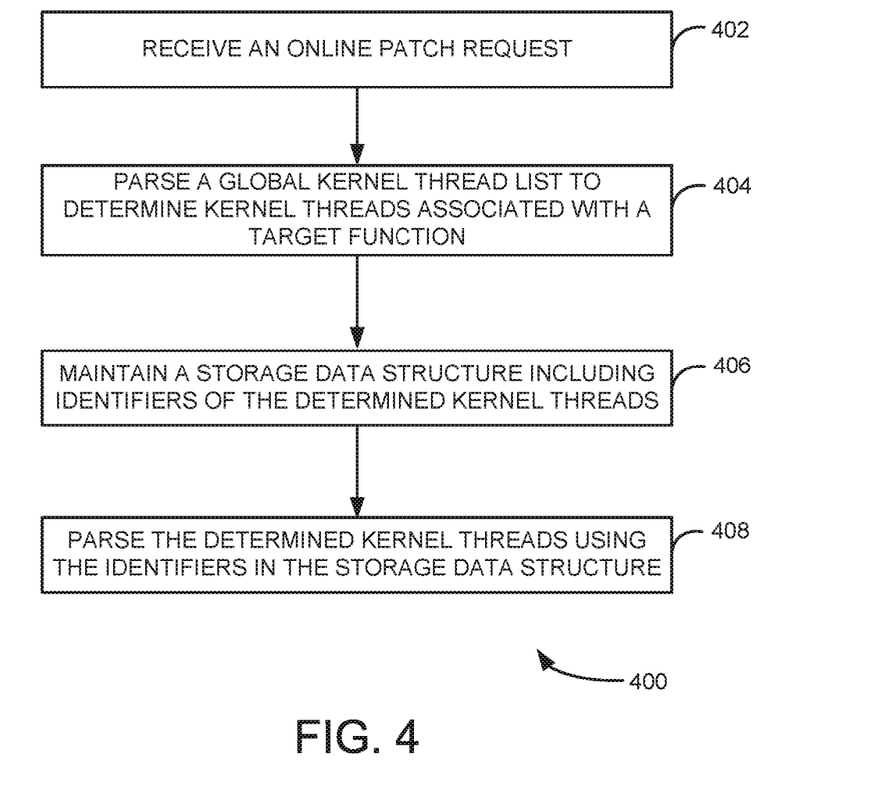
FIGS. 4 and 5 are flow diagrams depicting example methods for patching a kernel.
Figure 5:
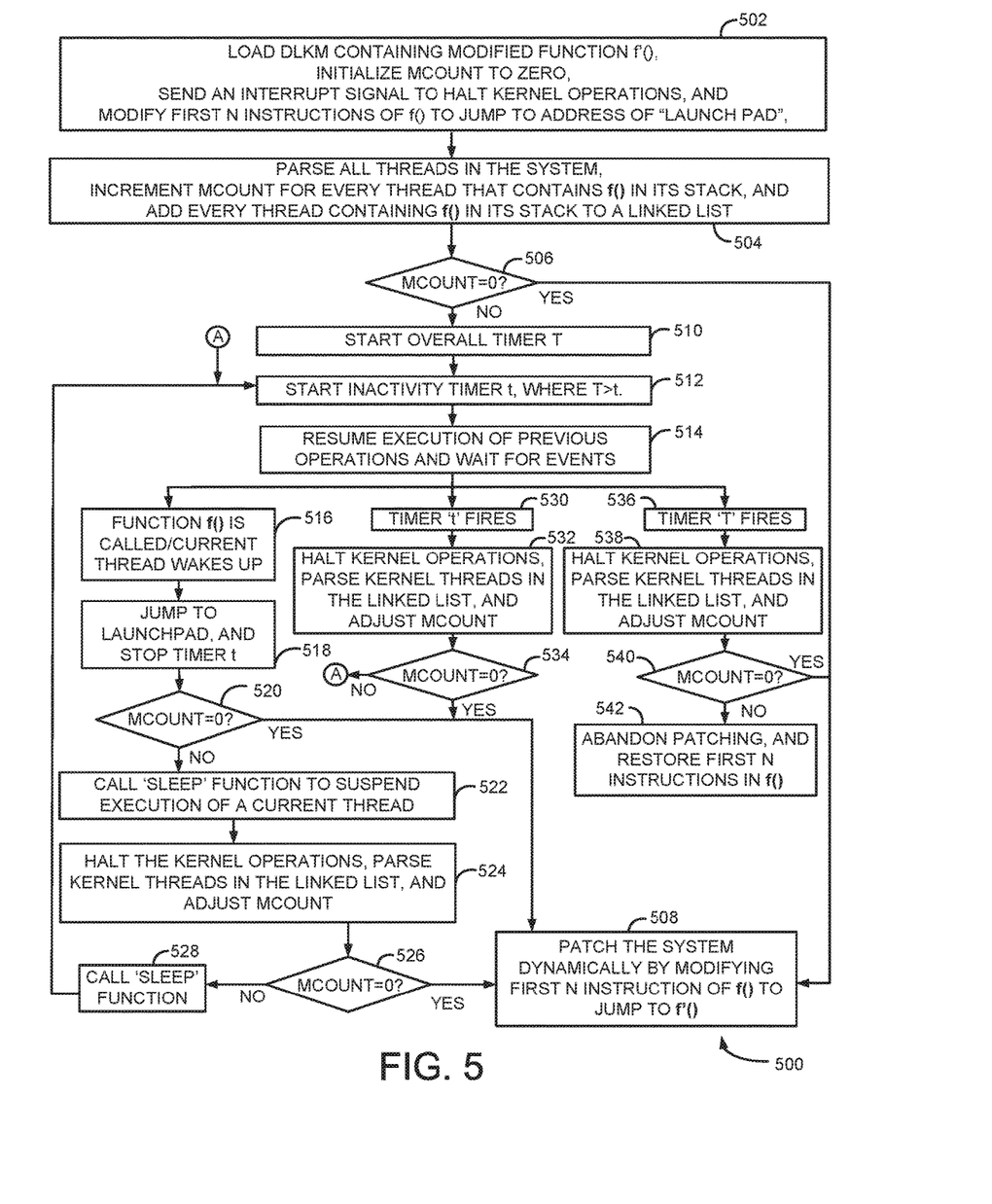

FIGS. 4 and 5 are flow diagrams depicting example methods for patching a kernel. Referring to flow diagram 400 of FIG. 4, at block 402, an online patch request is received. A system can receive a request to patch the kernel during operation of the kernel. To patch the kernel while the kernel is online, the kernel should not be executing the function to be patched. The online patch request can contain data to represent the target function. The data can be used to search the global kernel thread list for reference to the target function. Further, an interrupt can be sent to the processor resources to stop the system from executing operations to free up the processor resources of the system to assist in determining whether the system is in a safe state to patch the kernel. For example, the interrupt can be sent to all the active processor resources of the system to halt the operations on each one of the active processor resources.

At step 404, a global kernel thread list is parsed to determine kernel threads associated with a target function (e.g., using the thread analysis engine 102 of FIG. 1 and/or thread analysis module 206 of FIG. 2). At step 406, a storage data structure including identifiers of the determined kernel threads is maintained (e.g., using the thread analysis engine 102 and/or thread analysis module 206). Upon determining and updating the storage data structure with the kernel threads associated with the target function, the processor resources resume execution of previous operations and wait for an event to try again. Also, a counter including a thread count of kernel threads containing the target function can be maintained. The thread count of zero indicates that the global kernel thread list is free of the target function.

At step 408, the determined kernel threads are parsed using the identifiers in the storage data structure to determine when the global kernel thread list is free of the target function upon encountering an event associated with the target function (e.g., using the event handling engine 104 of FIG. 1 and/or event handling module 208 of FIG. 2). In this case, an interrupt can be sent to the processor resources to stop the system from executing operations to free up the processor resources of the system to assist in parsing the determined kernel threads. The thread count in the counter and the storage data structure can be updated each time when the event is encountered and the determined kernel threads are parsed. For example, the event can be receiving a new call to the target function, expiration of a maximum waiting time for applying kernel patch, and/or expiration of a time interval when no new call is made to the target function.

In one example, the determined kernel threads are parsed using the identifiers in the storage data structure when the time interval when no new call is made to the target function is expired. For example, consider that the time interval is set to 4 milliseconds. In this case, the kernel threads in the storage data structure are parsed for every 4 milliseconds to determine when the global kernel thread list is free of the target function when no new call is made within the time interval. Accordingly, the storage data structure and the thread count are updated with the kernel threads associated with the target function each time when the kernel threads in the storage data structure are parsed.

In another example, when the new call is received to the target function (i.e., within the time interval), a sleep function can be called to suspend execution of a current thread associated with the new call for a time period. While the current thread is in sleep mode, the determined kernel threads are parsed using the identifiers in the storage data structure to determine when the global kernel thread list is free of the target function. In this case, the kernel threads in the storage data structure are parsed to determine if the target function is still in use by any of the kernel threads. Accordingly, the thread count and the storage data structure are updated. In one example, if the thread count reaches zero and the patching operation is completed, then the current thread executes the patched function when the current thread associated with the new call wakes up after sleep. If the thread count does not reach zero (i.e., if the target function is in use by any of the kernel threads), then the storage data structure is updated with the kernel threads associated with the target function and calls the sleep function again to suspend execution of the current thread associated with the new call when the new call wakes up after sleep. Further, the previous kernel operations can be resumed to a previous state. This process is repeated until either the maximum waiting time for applying kernel patch is expired or the global kernel thread list is free of the target function.

In yet another example, the determined kernel threads are parsed using the identifiers in the storage data structure when the maximum waiting time for applying kernel patch is expired. If the kernel threads in the storage data structure are still using the target function after expiration of the maximum waiting time for applying kernel patch, then the kernel patching is abandoned.

FIG. 5 depicts a detailed process 500 for patching the kernel when the global kernel thread list is free of the target function. Consider f( ) be the target function in the memory and f'( ) be the modified function. The target function refers to original function in the memory that needs to be replaced by the modified function f'( ). For example, the first few lines/first 'N' instructions of the target function can be replaced with a long jump to a memory address where the replacement instruction block of modified function f'( ) is located. Consider an online patch request is received to replace the target function f( ) with modified function f'( ).

At block 502, the modified function f'( ) is packaged into a dynamically loadable kernel module (DLKM) and the DLKM is loaded into the system's memory. Further at block 502, a global counter (i.e., mcount) is initialized to zero. Furthermore at block 502, an interrupt signal can be sent to processor resources to halt kernel operations. For example, the interrupt signal can stop the processor resources that are currently active and dedicate the processor resources to processing the safe state determination. Also at block 502, the first 'N' instructions of target function f( ) are modified to instrument a JUMP to a predefined location in the memory referred to as a "Launch Pad".

At block 504, the kernel threads of the system are parsed to figure out whether the target function f( ) is present in any stack associated with the kernel threads. Further at block 504, the mcount is incremented when the target function f( ) is encountered in any of the stacks. In this case, the mcount is incremented corresponding to a number of kernel threads associated with the target function. Furthermore at block 504, a linked list data structure (i.e., an example for storage data structure) containing thread identifiers of the kernel threads associated with the target function can be maintained when the target function f( ) is encountered in any of the stacks.

At block 506, a check is made to determine whether mcount is equal to zero. In one example, the thread count of zero indicates that the global kernel thread list is free of the target function and the system is in safe state for dynamic kernel patching. If the mcount is zero, then the process goes to block 508 where the system can dynamically patched by modifying first 'N' instructions of target function f( ) to jump to the replacement instructions of the modified function f'( ) and a current execution context is transferred to the modified function f( ). For example, any new calls after patching, may be automatically transferred to the modified function f'( ).

If the mcount is not zero at block 506, then an overall timer T can be started at block 510. The overall timer T indicates a maximum time to wait for the mcount to become zero and expiration of the overall timer T indicates that the system is too busy for dynamic kernel patching. At block 512, an inactivity timer t can be started. The inactivity timer t indicates the time to check for mcount when no new call is made to the target function f( ) and expiration of the inactivity timer t indicates the time to check for the mcount. In this case, overall timer T is greater that the inactivity timer t.

At block 514, execution of previous kernel operations by the processor resources is resumed. For example, a stop flag is set to signal the processor resources to resume execution of the previous operations. Further, the processor resources wait for an event before trying to parse the kernel threads again. In an example, the event can include receiving a new call to the target function as shown in block 516, expiration of a maximum waiting time for applying kernel patch (i.e., firing of timer T as shown in block 536), and/or expiration of a time interval when no new call is made to the target function (i.e., firing of timer t as shown in block 530).

At block 516, a new call is made to the target function f( ). At block 518, the new call is directed to the launch pad as the first 'N' instructions of f( ) is replaced by a JUMP to the launch pad and the inactivity timer t is stopped upon receiving the new call to the target function f( ). In one example, the new call is directed to the launch pad to trigger the sleep function, subsequently to halt the kernel operations and to start parsing of the determined kernel threads in the linked list data structure.

At block 520, a check is made to determine whether mcount is equal to zero. If the mcount is zero, then the process goes to block 508 where the system can be dynamically patched. If mcount is not zero at block 520, then a sleep function is called to suspend execution of a current thread associated with the new call for a specific time at block 522. The current thread associated with the new call is put into sleep mode. At block 524, while the current thread associated with the new call is in sleep mode, the kernel operations are halted and the stacks of each kernel thread in the linked list data structure are parsed using the identifiers in the linked list data structure. Further, the linked list data structure and the mcount are updated based on the outcome of parsing at block 524. At block 526, a check is made to determine whether mcount is equal to zero. If the mcount is not zero, the sleep function is called again at block 528 and the process goes to step 512 and repeats the process until either the maximum waiting time for applying kernel patch is expired or the global kernel thread list is free of the target function.

If the mcount is zero at block 526, the process goes to block 508 where the system can be dynamically patched. In this example, the current thread associated with the new call simply jumps to the modified function f'( ) after waking up from sleep.

At block 530, the inactivity timer t fires indicating that the time to check for mcount when no new call is made to the target function is reached. At block 532, the kernel operations are halted and the stacks of each kernel thread in the linked list data structure are parsed using the identifiers in the linked list data structure when the inactivity timer t is fired. Further, the linked list data structure and the mcount are updated based on the outcome of parsing at block 532. At block 534, a check is made to determine whether mcount is equal to zero. If the mcount is zero, then the process goes to block 508 where the system can be dynamically patched. If the mcount is not zero, then the inactivity timer t is started and process goes to step 512 and repeats the process until either the maximum waiting time for applying kernel patch is expired or the global kernel thread list is free of the target function.

At block 536, the overall timer T fires indicating that maximum time to wait for mcount to become zero is reached. At step 538, the kernel operations are halted and the stacks of each kernel thread in the linked list data structure is parsed using the identifiers in the linked list data structure when the inactivity timer t is fired. Further, the linked list data structure and the mcount are updated based on the outcome of parsing at block 538. At block 540, a check is made to determine whether mcount is equal to zero. If the mcount is zero, then the process goes to block 508 where the system can be dynamically patched. If the mcount is not zero, then the process of dynamic kernel patching is abandoned indicating that the system is busy for kernel patching at block 542. Further, the first N instructions are restored in the target function f( ).

Although the flow diagrams of FIGS. 4-5 illustrate specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method executed by at least one processor resource for patching a kernel comprising:
   receiving, by at least one processor resource, an online patch request;
   sending an interrupt to halt kernel operations of the kernel;
   parsing a global kernel thread list to determine kernel threads associated with a target function;
   maintaining, by the at least one processor resource, a storage data structure including identifiers of the determined kernel threads;
   resuming execution of the halted kernel operations and wait for an event; and
   halting the kernel operations and parsing the determined kernel threads using the identifiers in the storage data structure to determine when the global kernel thread list is free of the target function upon encountering the event associated with the target function.

2. The method of claim 1, wherein encountering the event comprises at least one of receiving a new call to the target function, expiration of a maximum waiting time for applying kernel patch, and expiration of a time interval when no new call is made to the target function.

3. The method of claim 2, further comprising:
   calling a sleep mode to suspend execution of a current thread associated with the new call for a time period when the new call is received to the target function; and
   parsing the determined kernel threads using the identifiers in the storage data structure to determine if the global kernel thread list is free of the target function when the current thread associated with the new call is in the sleep mode.

4. The method of claim 2, further comprising:
   parsing the determined kernel threads using the identifiers in the storage data structure when at least one of the maximum waiting time for applying kernel patch and the time interval when no new call is made to the target function is expired.

5. The method of claim 1, further comprising:
   setting a start flag to signal the processor resources to halt the kernel operations; and
   setting a stop flag to signal the processor resources to resume execution of the halted kernel operations and wait for the event.

6. A system for patching a kernel comprising:
   memory;
   at least one processor resource coupled to the memory to:
   receive an online patch request;
   send an interrupt to halt kernel operations;
   parse a global kernel thread list to determine kernel threads associated with a target function;

maintain a storage data structure including identifiers of the determined kernel threads;

resume execution of the halted kernel operations and wait for an event; and halt the kernel operations and parse the determined kernel threads using the identifiers in the storage data structure to determine when the global kernel thread list is free of the target function upon encountering the event associated with the target function.

7. The system of claim 6, wherein encountering the event comprises at least one of receiving a new call to the target function, expiration of a maximum waiting time for applying kernel patch, and expiration of a time interval when no new call is made to the target function.

8. The system of claim 7, wherein the at least one processor resource is further to:

call a sleep mode to suspend execution of a current thread associated with the new call for a time period when the new call is received to the target function; and parse the determined kernel threads using the identifiers in the storage data structure to determine if the global kernel thread list is free of the target function when the current thread associated with the new call is in the sleep mode.

9. The system of claim 7, wherein the at least one processor resource is further to:

parse the determined kernel threads using the identifiers in the storage data structure when at least one of the maximum waiting time for applying kernel patch and the time interval when no new call is made to the target function is expired.

10. The system of claim 6, wherein the at least one processor resource is further to:

set a start flag to signal the processor resources to halt the kernel operations; and set a stop flag to signal the processor resources to resume execution of the halted kernel operations and wait for the event.

11. A non-transitory computer readable storage medium comprising a set of instructions executable by at least one processor resource to:

receive an online patch request;

send an interrupt to halt kernel operations;

parse a global kernel thread list to determine kernel threads associated with a target function;

maintain a storage data structure including identifiers of the determined kernel threads;

resume execution of the halted kernel operations and wait for an event; and halt the kernel operations and parse the determined kernel threads using the identifiers in the storage data structure to determine when the global kernel thread list is free of the target function upon encountering the event associated with the target function.

12. The non-transitory computer readable storage medium of claim 11, wherein encountering the event comprises at least one of receiving a new call to the target function, expiration of a maximum waiting time for applying kernel patch, and expiration of a time interval when no new call is made to the target function.

13. The non-transitory computer readable storage medium of claim 12, wherein the set of instructions to:

call a sleep mode to suspend execution of a current thread associated with the new call for a time period when the new call is received to the target function; and parse the determined kernel threads using the identifiers in the storage data structure to determine if the global kernel thread list is free of the target function when the current thread associated with the new call is in the sleep mode.

14. The non-transitory computer readable storage medium of claim 12, wherein the set of instructions to:

parse the determined kernel threads using the identifiers in the storage data structure when at least one of the maximum waiting time for applying kernel patch and the time interval when no new call is made to the target function is expired.

15. The non-transitory computer readable storage medium of claim 11, wherein the set of instructions is to:

set a start flag to signal the processor resources to halt the kernel operations; and set a stop flag to signal the processor resources to resume execution of the halted kernel operations and wait for the event.

* * * * *